(12) United States Patent
Atungsiri et al.

(10) Patent No.: US 12,193,029 B2
(45) Date of Patent: *Jan. 7, 2025

(54) WIRELESS TELECOMMUNICATIONS APPARATUS AND METHODS

(71) Applicant: Sony Group Corporation, Tokyo (JP)

(72) Inventors: Samuel Asangbeng Atungsiri, Basingstoke (GB); Shin Horng Wong, Basingstoke (GB); Martin Warwick Beale, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,124

(22) Filed: Jul. 17, 2023

(65) Prior Publication Data

US 2023/0362949 A1 Nov. 9, 2023

Related U.S. Application Data

(63) Continuation of application No. 17/136,042, filed on Dec. 29, 2020, now Pat. No. 11,706,772, which is a
(Continued)

(30) Foreign Application Priority Data

Nov. 11, 2016 (EP) ..................................... 16198538

(51) Int. Cl.
*H04W 72/23* (2023.01)
*H04L 1/00* (2006.01)
(Continued)

(52) U.S. Cl.
CPC ........... *H04W 72/23* (2023.01); *H04L 1/0057* (2013.01); *H04L 1/0061* (2013.01);
(Continued)

(58) Field of Classification Search
CPC .............. H04W 72/23; H04W 72/0446; H04L 1/0057; H04L 1/0061; H04L 25/0202; H04L 27/2697
See application file for complete search history.

(56) References Cited

U.S. PATENT DOCUMENTS 9,241,347 B2 1/2016 Aminaka et al.
9,955,460 B2 4/2018 Tavildar et al.
(Continued)

FOREIGN PATENT DOCUMENTS

CN 102781099 A 11/2012
CN 105979597 A 9/2016
(Continued)

OTHER PUBLICATIONS

NTT Docomo, "New SID Proposal: Study on New Radio Access Technology," 3GPP TSG RAN Meeting #71, RP-160671, Mar. 7-10, 2016, pp. 8.
(Continued)

*Primary Examiner* — Shah M Rahman
(74) *Attorney, Agent, or Firm* — XSENSUS LLP

(57) ABSTRACT

A method of operating a wireless telecommunications system for communicating higher layer data from network infrastructure comprises establishing an allocation of radio resources for the network infrastructure equipment to use for transmitting higher layer data to the terminal device during a higher layer data transmission period; transmitting an indication of the allocated radio resources to the terminal device; beginning transmission of the higher layer data to the terminal device at the beginning of the higher layer data transmission period; and subsequently identifying during the higher layer data transmission period whether any of the allocated radio resources which have not yet been used are needed by the network infrastructure equipment for trans-
(Continued)

mitting other data in the wireless telecommunications system.

20 Claims, 8 Drawing Sheets

Related U.S. Application Data continuation of application No. 16/346,129, filed as application No. PCT/EP2017/075546 on Oct. 6, 2017, now Pat. No. 10,887,878.

(51) Int. Cl.
  *H04L 25/02* (2006.01)
  *H04L 27/26* (2006.01)
  *H04W 72/0446* (2023.01)

(52) U.S. Cl.
  CPC ...... *H04L 25/0202* (2013.01); *H04L 27/2697* (2013.01); *H04W 72/0446* (2013.01)

(56) References Cited

U.S. PATENT DOCUMENTS

| | | | |
|---|---|---|---|
| 2010/0165931 | A1 | 7/2010 | Nimbalker et al. |
| 2010/0195566 | A1 | 8/2010 | Krishnamurthy et al. |
| 2014/0092785 | A1 | 4/2014 | Song et al. |
| 2014/0307697 | A1 | 10/2014 | Beale |
| 2015/0085776 | A1 | 3/2015 | Morioka |
| 2015/0282155 | A1 | 10/2015 | Webb et al. |
| 2015/0334685 | A1 | 11/2015 | Ji et al. |
| 2015/0382372 | A1 | 12/2015 | Vajapeyam et al. |
| 2016/0173247 | A1 | 6/2016 | Patel et al. |
| 2016/0174238 | A1 | 6/2016 | Chen et al. |
| 2017/0208591 | A1* | 7/2017 | Rico Alvarino ........ H04L 27/18 |
| 2017/0310431 | A1* | 10/2017 | Iyer ...................... H04W 72/23 |
| 2017/0332359 | A1 | 11/2017 | Tsai et al. |
| 2017/0332396 | A1* | 11/2017 | Liao ................. H04L 27/26025 |
| 2017/0353963 | A1* | 12/2017 | Hong .................... H04L 1/1819 |
| 2018/0027576 | A1 | 1/2018 | Kowalski et al. |
| 2018/0035459 | A1 | 2/2018 | Islam et al. |
| 2018/0041858 | A1 | 2/2018 | Sheng et al. |
| 2018/0063749 | A1 | 3/2018 | Islam et al. |
| 2018/0070341 | A1 | 3/2018 | Islam et al. |
| 2018/0083758 | A1 | 3/2018 | Islam et al. |
| 2018/0083817 | A1 | 3/2018 | Salem et al. |
| 2018/0091267 | A1 | 3/2018 | Kim et al. |
| 2018/0092104 | A1 | 3/2018 | Sheng et al. |
| 2018/0254860 | A1 | 9/2018 | Wong et al. |
| 2019/0165882 | A1* | 5/2019 | You ................... H04W 72/0446 |
| 2019/0165906 | A1* | 5/2019 | Bala ...................... H04L 5/0048 |
| 2019/0182088 | A1 | 6/2019 | Shimizu et al. |
| 2019/0208534 | A1 | 7/2019 | Chen et al. |
| 2019/0215133 | A1 | 7/2019 | Pan et al. |
| 2019/0261357 | A1 | 8/2019 | Lu et al. |
| 2019/0280802 | A1 | 9/2019 | Ma et al. |

FOREIGN PATENT DOCUMENTS

| | | | |
|---|---|---|---|
| WO | WO-2016101685 A1 * | 6/2016 | |
| WO | 2018/050431 A1 | 3/2018 | |
| WO | 2018/059876 A1 | 4/2018 | |

OTHER PUBLICATIONS

Holma et al., "LTE for UMTS OFDMA and SC-FDMA Based Radio Access", Wiley 2009, System Architecture Based on 3GPP SAE, 11 pp. 1-11.

3GPP, "3rd Generation Partnership Project; Technical Specification Group Radio Access Network; Study on Downlink Multiuser Superposition Transmission for LTE," 3GPP TR 36.859 V13.0.0, Dec. 2015, pp. 1-48.

ZTE, Microelectronics, "Multiplexing of eMBB and URLLC," 3GPP TSG RAN WGI Meeting #86, Aug. 22-26, 2016, pp. 1-10.

International Search Report and Written Opinion mailed on Nov. 17, 2017 for PCT/EP2017/075546 filed on Oct. 6, 2017, 13 pages.

Wikipedia, "Error detection and correction", https://en.wikipedia.org/wiki/Error_detection_and_correction, Retrieved May 2, 2010, Total pp. 25 (Year: 2020).

Wikipedia, "Low-density parity-check code", https://en.wikipedia.org/wiki/Low-density_parity-check_code, Retrieved May 2, 2020 (Year: 2020).

* cited by examiner

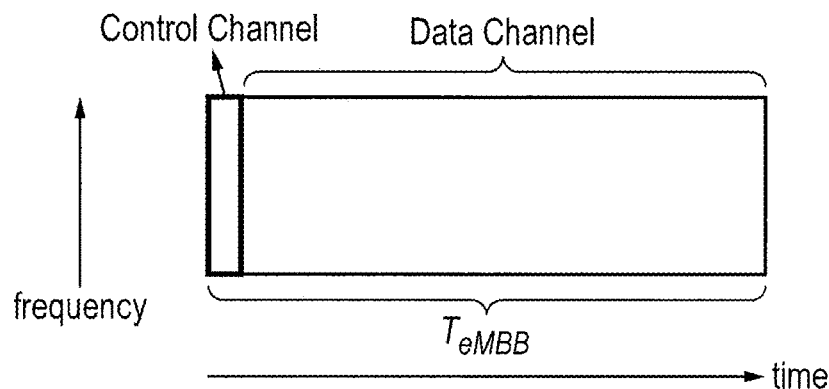
FIG. 3 (eMBB)
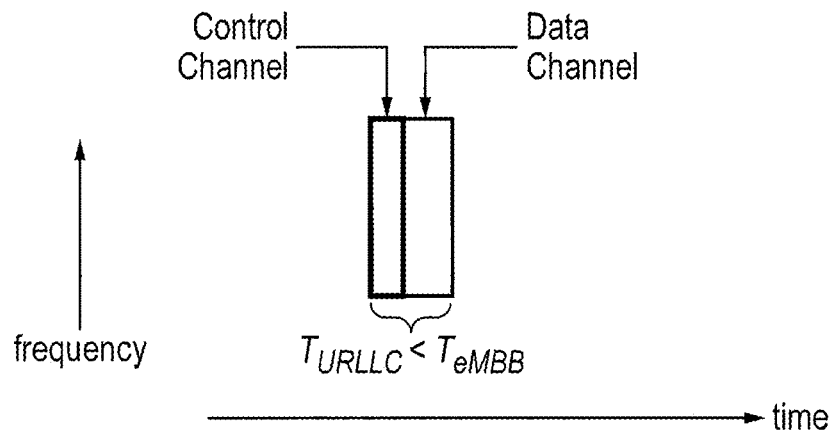
FIG. 4 (URLLC)
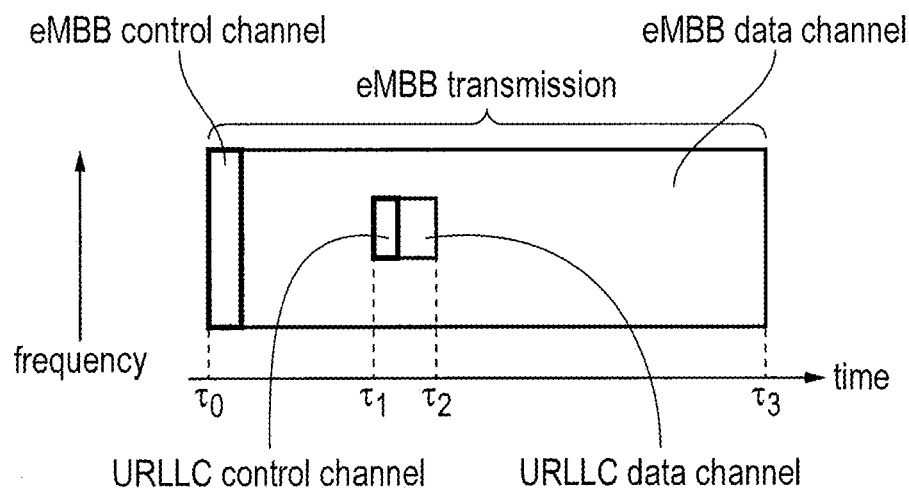
FIG. 5

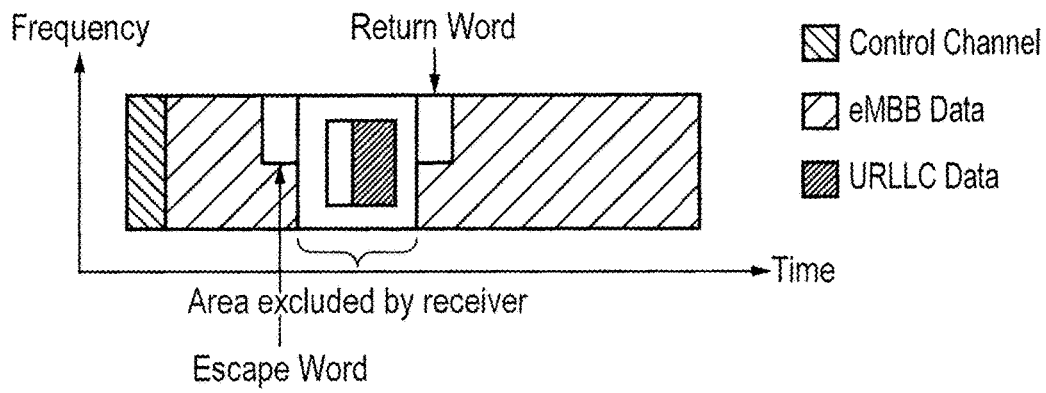
FIG. 8
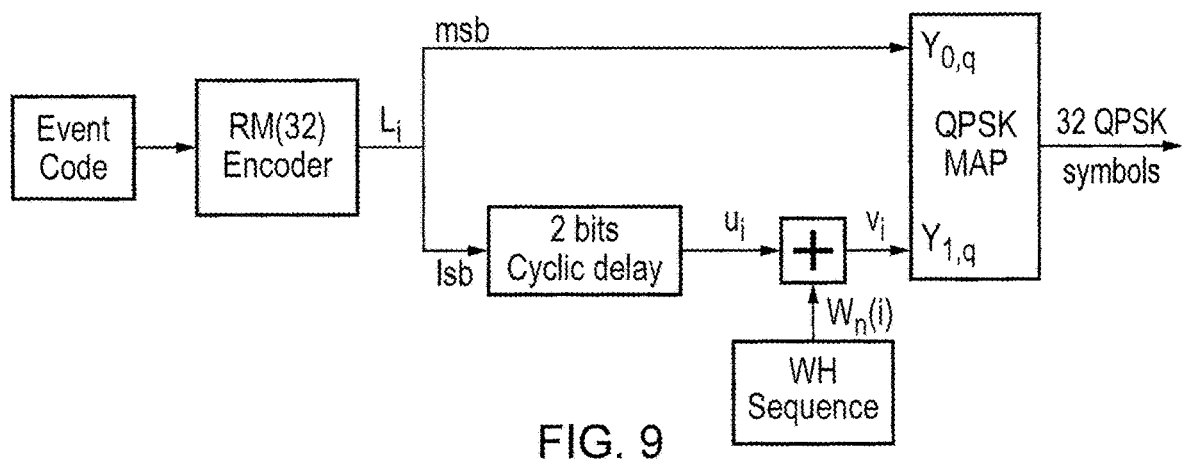
FIG. 9
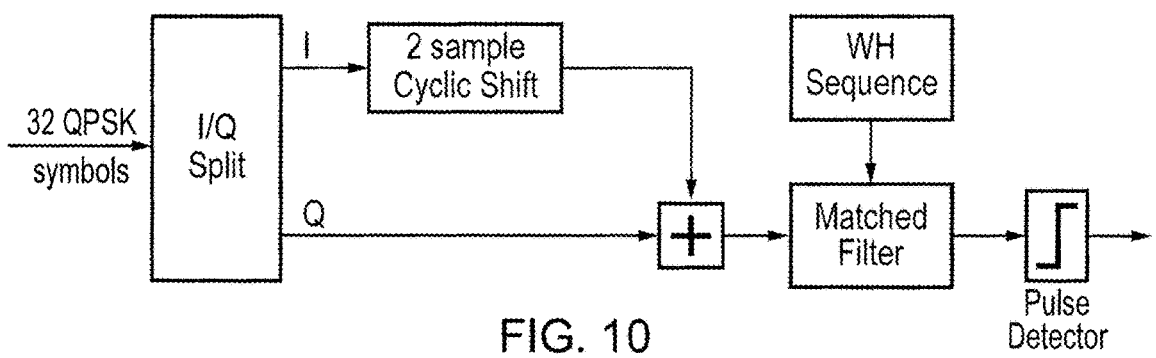
FIG. 10
| Event | Code Input (hex) |
|---|---|
| ESCAPE | 002 |
| RETURN | 220 |
| ESCAPE with eMBB HARQ | 008 |
| RETURN with eMBB HARQ | 181 |
FIG. 11

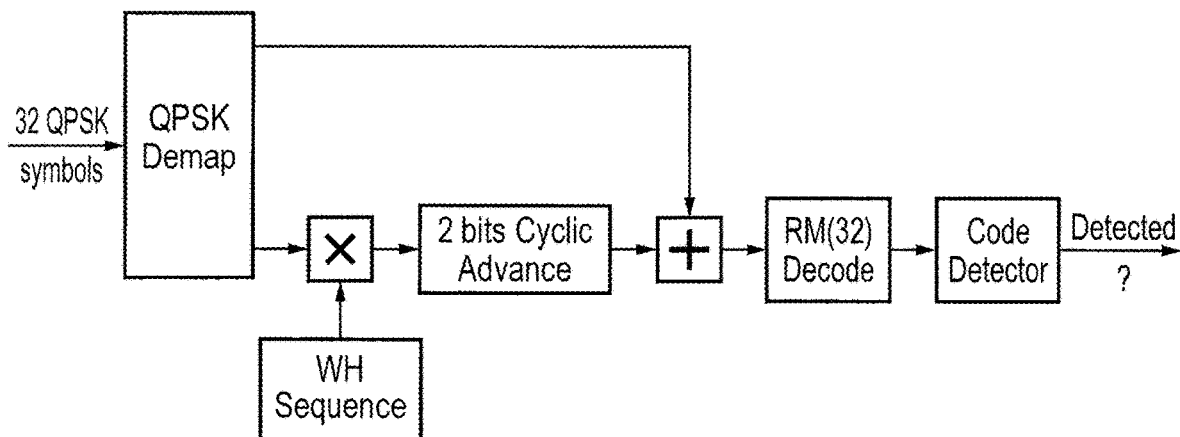
FIG. 12
| WH Code Number | WH Code (Hex) |
|---|---|
| 1 | AAAAAAAA |
| 2 | 99999999 |
| 3 | A5A5A5A5 |
| 4 | AA55AA55 |
| 5 | AAAA5555 |
| 6 | 99996666 |
| 7 | A55AA55A |
| 8 | A5A55A5A |
FIG. 13
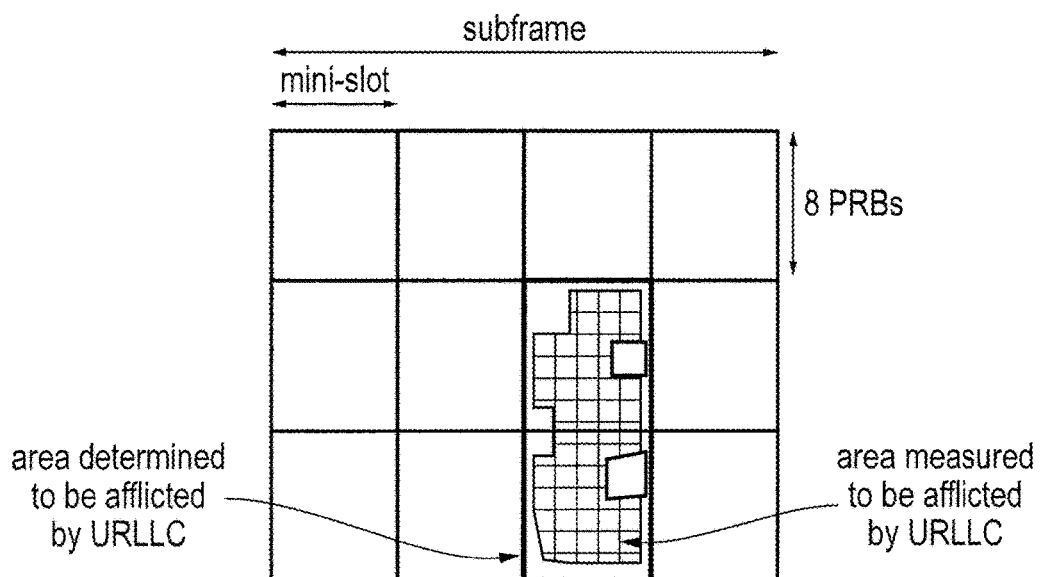
FIG. 14

WIRELESS TELECOMMUNICATIONS APPARATUS AND METHODS

CROSS-REFERENCE TO RELATED APPLICATIONS

This application is a continuation of U.S. application Ser. No. 17/136,042, filed Dec. 29, 2020, which is a continuation of U.S. application Ser. No. 16/346,129, filed Apr. 30, 2019 (now U.S. Pat. No. 10,887,878), which is based on PCT filing PCT/EP2017/075546 filed Oct. 6, 2017, which claims priority to EP 16198538.7 filed Nov. 11, 2016, the entire contents of each are incorporated herein by reference.

BACKGROUND

Field

The present disclosure relates to wireless telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to increase rapidly.

Future wireless communications networks will be expected to efficiently support communications with a wider range of devices associated with a wider range of data traffic profiles and types than current systems are optimised to support. For example it is expected future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Yet other types of device, for example used for autonomous vehicle communications, may be characterised by data that should be transmitted through with low latency. A single device type might also be associated with different traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/ new radio access technology (RAT) systems, as well as future iterations/releases of existing systems, to efficiently support connectivity for a wide range of devices associated with different applications and different characteristic data traffic profiles.

Example use cases currently considered to be of interest for next generation wireless communication systems include so-called Enhanced Mobile Broadband (eMBB) and Ultra Reliable and Low Latency Communications (URLLC). See, for example, the 3GPP document RP-160671, "New SID Proposal: Study on New Radio Access Technology," NTT DOCOMO, RAN #71 [1].

On the one hand, eMBB services may be typically characterised as high capacity services, for example, supporting up to 20 Gb/s. For efficient transmission of large amounts of data at high throughput, eMBB services may be expected to use a long scheduling time so as to minimise resource allocation signalling overhead, where scheduling time refers to the time available for data transmission between resource allocations. In other words, eMBB services are expected to rely on relatively infrequent allocation messages that allocate radio resources for higher layer data for a relatively long period of time between allocation messages (i.e. such that radio resources are allocated in relatively large blocks).

On the other hand URLLC services are low latency services, for example aiming to transmit relatively small amounts of data through the radio network with a 1 ms packet transit time (i.e. so that each piece of URLLC data needs to be scheduled and transmitted across the physical layer in a time that is shorter than 1 ms). Consequently, more frequent allocation message opportunities (i.e. smaller/ shorter scheduling times) are generally expected to be desired for supporting URLLC services as compared to eMBB services.

Thus it will be apparent eMBB and URLLC have different requirements and expectations in that providing a high capacity data channel with low allocation signalling overhead is relatively more important for eMBB than for URLLC, whereas providing for data packets received at layer 2 to be transmitted through the network rapidly (i.e. with low latency) is relatively more important for URLLC than for eMBB. There is also the more general overall desire to make most efficient and flexible use of radio resources available in wireless telecommunications systems by avoiding the partitioning of radio resources for different services and instead allowing for a common pool of radio resources to be allocated to different services (e.g. eMBB and URLLC) in a dynamic manner, for example having regard to current traffic conditions for the different services.

The inventors have recognized that the desire to efficiently support transmissions for different services with different characteristics, such as eMBB and URLLC, in a wireless telecommunications system gives rise to new challenges that need to be addressed to help optimise the operation of wireless telecommunications systems.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 3 schematically represents a radio resource grid for an example radio frame structure for an eMBB data service;

FIG. 4 schematically represents a radio resource grid for an example radio frame structure for a URLLC data service;

FIG. 5 schematically represents a radio resource grid multiplexing the eMBB radio frame structure of FIG. 3 and the URLLC radio frame structure of FIG. 4.

FIG. 8 schematically represents a radio resource grid multiplexing eMBB data and URLLC data with a first predefined signature sequence (escape word) provided to indicate the start of a region containing the URLLC data and a second predefined signature sequence (return word) provided to indicate the end of the region containing the URLLC data in accordance with certain embodiments of the disclosure;

FIG. 9 schematically represents a process for introducing one of the predefined sequences of FIG. 8 into transmissions from network infrastructure equipment in accordance with certain embodiments of the disclosure;

FIG. 10 schematically represents a process for detecting one of the predefined sequences of FIG. 8 in transmissions received from network infrastructure equipment in accordance with certain embodiments of the disclosure;

FIG. 11 is a table schematically representing some example code words to use for the predefined sequences of FIG. 8;

FIG. 12 schematically represents a process for authenticating the detection of one of the example code words of FIG. 11 in transmissions received from network infrastructure equipment;

FIG. 13 is a table schematically representing some example Walsh-Hadamard (WH) sequences for use in the processes represented in FIGS. 9 and 10;

FIG. 14 schematically represents locations in a radio resource grid where a terminal device detects that URLLC data has been transmitted on radio resources previously allocated for the transmission of eMBB data to the terminal device and an indication of a corresponding estimated location and extent of the radio resources used for transmitting the URLLC data in the radio resource grid.

DETAILED DESCRIPTION OF THE EMBODIMENTS

Figure 1:
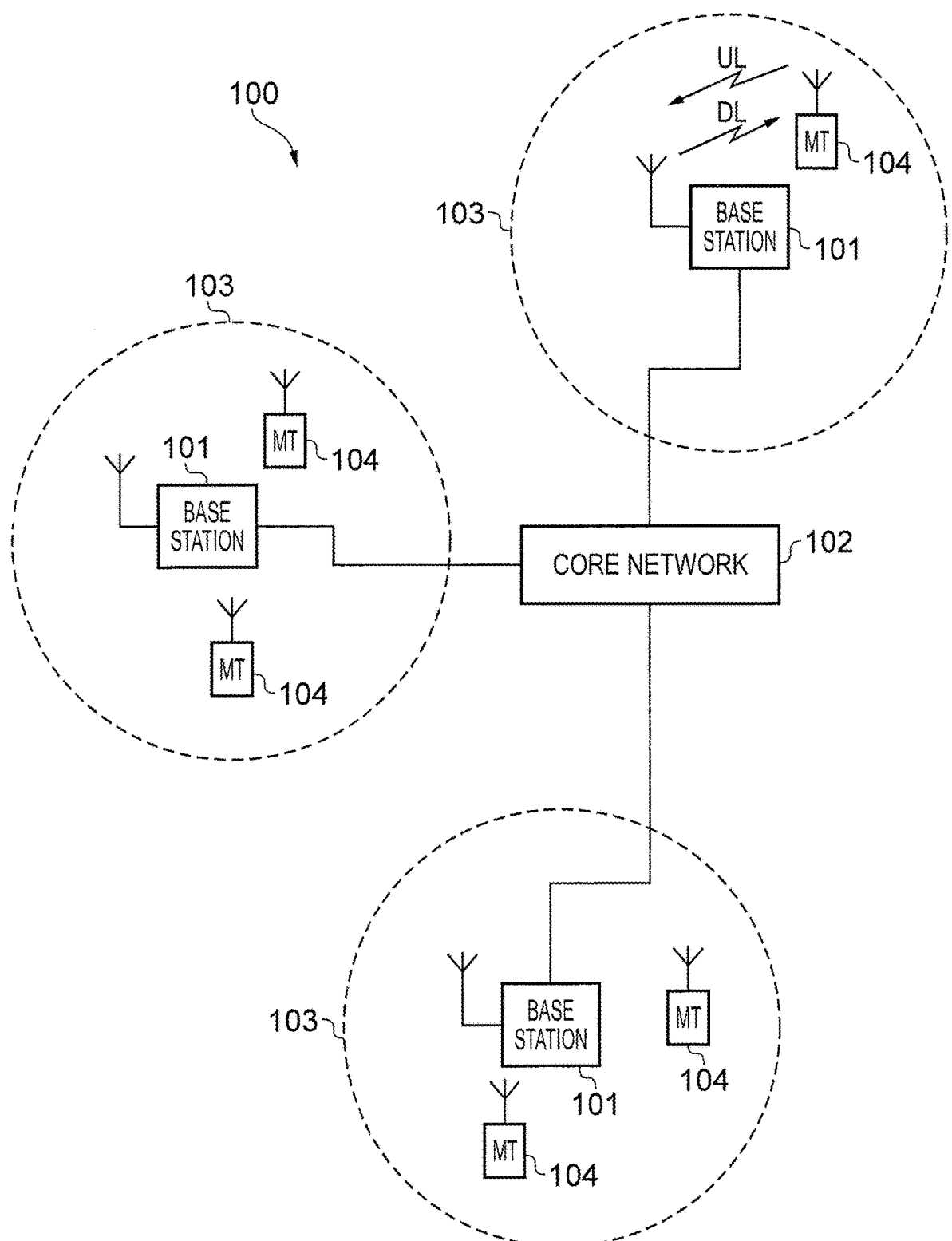
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs, and so forth.

Figure 2:
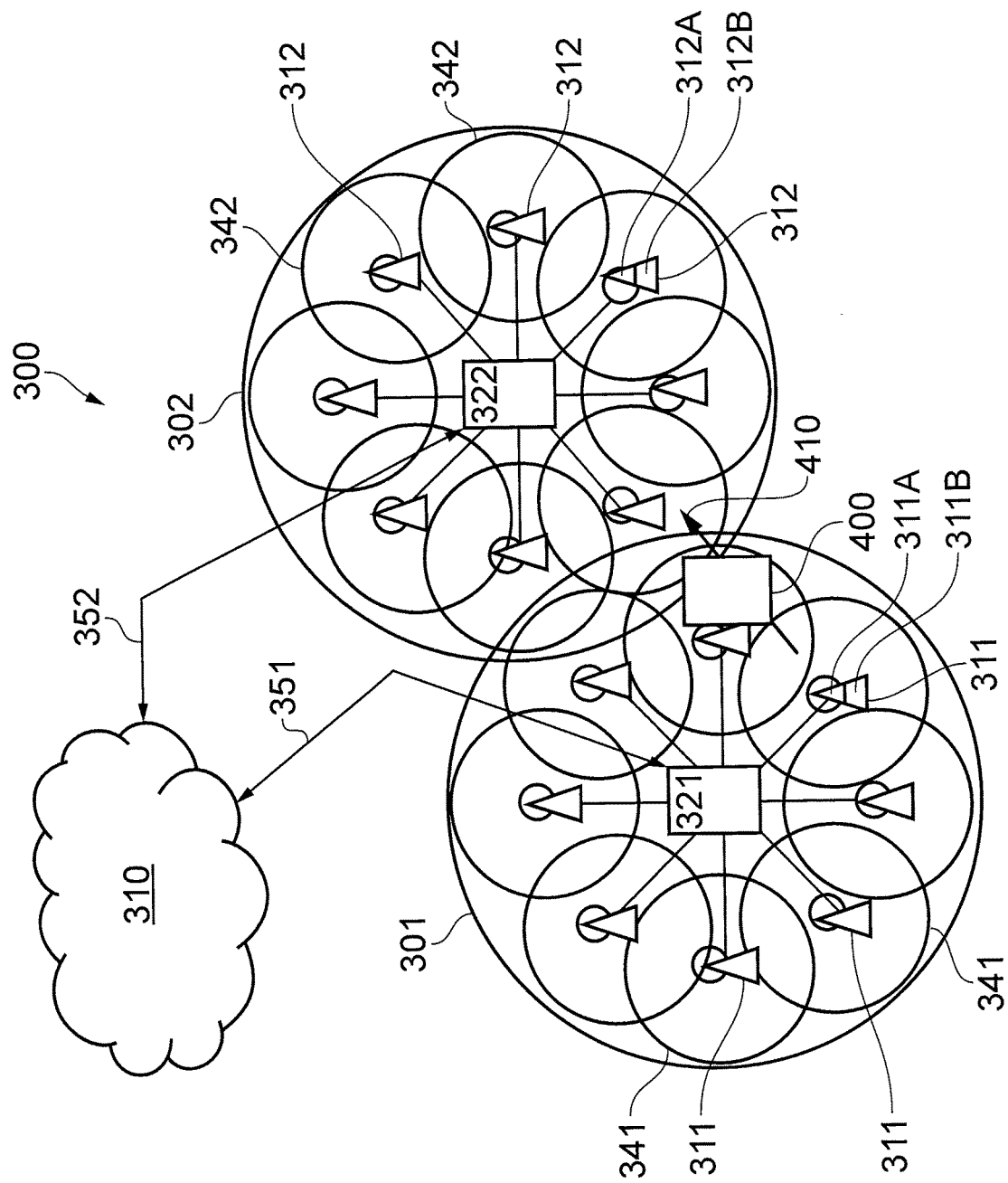
FIG. 2 schematically represents some aspects of a new radio access technology (RAT) wireless telecommunications network which may be configured to operate in accordance with certain embodiments of the present disclosure.

FIG. 2 is a schematic diagram illustrating a network architecture for a new RAT wireless mobile telecommunications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 310 of the new RAT telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1. The term network infrastructure equipment/element may be used to encompass these elements and more conventional base station type elements of wireless telecommunications systems. Depending on the application at hand the responsibility for scheduling transmissions on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. The active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures. That is to say, the specific wireless telecommunications architecture for a wireless telecommunications system adapted to implement functionality in accordance with the principles described herein is not significant to the principles underlying the described approaches.

Certain embodiments of the invention as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certainly embodiments of the disclosure may be described generally in the context of network infrastructure equipment communicating with a terminal device, wherein the specific nature of the network infrastructure equipment and the terminal device will depend on the network infrastructure for the implementation at hand. For example, in some scenarios the network infrastructure equipment may comprise a base station, such as an LTE-type base station 101 as shown in FIG. 1 which is adapted to provide functionality in accordance with the principles described herein, and in other examples the network infrastructure equipment may comprise a control unit 321, 322 and/or a TRP 311, 312 of the kind shown in FIG. 2 which is adapted to provide functionality in accordance with the principles described herein.

As discussed above, mobile communications networks such the network 100 shown in FIG. 1 and the network 300 shown in FIG. 2 may support services with different characteristics, such as services for which high data throughput with low signalling overhead is a primary concern (e.g. eMBB), and service for which low latency is a primary concern (e.g. URLLC).

Examples of suitable downlink subframe structures for eMBB data and URLLC data are schematically illustrated in FIGS. 3 and 4 respectively. These figures each schematically represent an array/grid of radio resources arranged in time (horizontal axis) and frequency (vertical axis) that may be used to support the respective services. As is generally conventional for wireless telecommunications systems, each subframe structure in this example comprises a control channel region and a data channel region. The control channel region is used for communicating physical layer control information signalling, for example resource allocation signalling within Downlink Control Information (e.g. corresponding to DCI carried on PDCCH in an LTE context), and the data channel region is used for communicating higher layer data, e.g. data from a layer above the physical layer (e.g. corresponding to PDSCH in an LTE context used to communicate application layer data (which may be referred to as user plane data) and radio resource control signalling).

As can be seen from FIGS. 3 and 4, the control channel regions at the beginning of each subframe span a broadly comparable period of time, but the eMBB subframe (FIG. 3) has a data channel region that is longer than the data channel region of the URLLC subframe. Thus the overall duration $T_{eMBB}$ of the eMBB subframe is greater than the overall duration $T_{URLLC}$ of the URLLC subframe and a greater proportion of the radio resources comprising the eMBB subframe support the data channel than for the URLLC subframe. For example, the transmission period $T_{eMBB}$ for the eMBB subframe might in some example implementations be 5 ms, 10 ms or 50 ms, whereas the transmission period $T_{URLLC}$ for the URLLC subframe might be 0.25 ms or 0.5 ms.

The relatively long subframe for eMBB means a single allocation message can allocate a relatively large amount of radio resources on the data channel, thereby helping to reduce overhead signalling. On the other hand, the relatively short subframe structure for URLLC can allow data received in the network to be transmitted without needing to wait for an unduly long time for a new subframe to start.

To help maintain overall efficiency it may be preferable for different services, such as eMBB and URLLC, to be flexibly multiplexed on the same carrier. That is to say, eMBB and URLLC traffic may be scheduled by the network on the same set of radio resources (in terms of time and/or frequency) according to current needs. Possible ways to multiplexing these different types of traffic having different subframe structures include:

Orthogonal time resources multiplexing. Here the base station (or other network infrastructure equipment) uses a scheduling interval that is short enough to meet URLLC latency requirements for both the eMBB and URLLC to allow URLLC and eMBB to be scheduled on orthogonal transmission resources. One potential drawback with this approach is that it creates a relatively large amount of scheduling-related overhead for the eMBB data thereby significantly reducing its spectral efficiency. Another option would be to reserve some time periods for URLLC transmissions. One potential drawback with this would be that the amount of reserved resources would typically have to be overestimated to try to ensure that resources are always available for URLLC transmissions (with a view to meeting the delay targets) which is likely to result in a sub-optimal use of available resources, and thus a loss of capacity for the network (which in turn would translate into a loss of capacity for eMBB traffic).

Orthogonal frequency resources, where eMBB and URLLC use different frequency resources. One potential drawback is that, as when reserving time resources for URLLC (see above), this is likely to result in a reduced overall capacity for the network. Also, in some systems, such as NR or 5G systems, orthogonal frequency resources may not be available because the network can sometimes be expected to serve many users and to occupy a large portion of resources for eMBB transmissions for a relatively long time.

Another approach to providing multiplexing of URLLC and eMBB transmissions in a manner that retains low latency for URLLC data is to allow eMBB data to be scheduled on all available resources that may be used for eMBB data and to simply allocate resources that have been previously allocated for eMBB data for URLLC data as and when needed. An example of this is schematically illustrated with reference to FIG. 5. Here it is assumed an eMBB downlink subframe for conveying eMBB data from network infrastructure equipment (such as a base station) to one or more terminal devices starts at time TO. The control channel region (eMBB control channel) comprises signalling for allocating radio resources in the data channel region (eMBB data channel) to one or more terminal devices, and this may be done having regard to the established techniques of resource allocation in wireless telecommunications systems.

Just before time τ1 it is assumed the network infrastructure equipment identifies it is required to communicate URLLC data to a terminal device. Rather than wait until the end of the eMBB subframe, the network infrastructure equipment simply transmits the URLLC data using some of the radio resources that had previously been allocated for conveying eMBB data. As schematically represented in FIG. 5, this is done in this example by using some of the radio resources to transmit a URLLC control channel to allocate the URLLC data, and then some of the radio resources to transmit a URLLC data channel to communicate the URLLC data to the relevant terminal device (in practice the particular URLLC subframe structure is not significant).

As schematically shown in FIG. 5, it is assumed here the URLLC is transmitted on a relatively narrow band within the eMBB data (although this is not in itself significant) and in this particular example requires a time from τ1 to τ2 to communicate the URLLC data. After τ2, when the transmission of the URLLC data is complete, the network infrastructure equipment may resume transmitting eMBB data in accordance with the allocation set out in the eMBB control channel of the subframe in the usual way.

Thus, put simply, in accordance with this approach, rather than wait for radio resources to become available, the network infrastructure equipment is configured to transmit the URLLC data using radio resources that have previously been allocated for transmitting eMBB data. That is to say, the URLLC transmissions occupy a portion of the resources previously allocated for eMBB transmissions.

Different methods for multiplexing the two types of transmissions using resources previously allocated for one of the transmissions include:

Superposing: The base station (or other network infrastructure equipment) schedules the eMBB in the most efficient way, for example with long scheduling intervals as discussed with respect to FIG. 3. Then when a URLLC transport block arrives, this is superposed (for example by use of multi-user superposition "MUST", such as described in the 3GPP document TR36.859: Technical Specification Group Radio Access Network; "Study on Downlink Multiuser Superposition Transmission (MUST) for LTE"; (Release 13), November 2015 [3]) on the eMBB transmission. This means that the eMBB transmission would be subject to multi-user superposition interference on those resource elements co-allocated to the URLLC transport blocks. One potential drawback with this approach is that it could potentially result in both the eMBB and the URLLC transmissions being corrupted.

Puncturing: The base station (or other network infrastructure equipment) schedules the eMBB in the most efficient way, for example with relatively long scheduling intervals (subframe duration) as discussed above. Then the eNodeB punctures the eMBB transmission to create space to fit the arriving URLLC transport block. This means that some of the transmission resources previously designated for use by the eMBB transport blocks are allowed to be used for transmitting URLLC transport blocks instead. The eMBB samples that were designated to be transmitted on the punctured transmission resources are not transmitted at all and are effectively removed from the transmission.

Superposing or puncturing an eMBB transmission as discussed above would affect the likelihood of the eMBB transmission being safely received or recovered and this may lead to a failed transmission. Some possible methods to help ensure recovery of the eMBB transport block (TB) include:

Use of an existing HARQ retransmission scheme (or similar) which allows the data of the eMBB packet to be retransmitted when the data was too corrupted to be recovered. However unlike other transmissions (e.g. legacy LTE packet transmission), eMBB transmissions can be resource intensive and the retransmission would occupy a large portion of the available resources. This could therefore result in a large number of resources being required for retransmitting the corrupted data (which may be much larger than the resources used for the URLLC transmission).

Use outer layer coding, where additional coding is performed on multiple eMBB code blocks. However this would increase the latency in receiving the eMBB packets since the terminal device needs to receive several eMBB code blocks and the outer layer coding parity bits in order to perform the outer layer decoding process and since the eMBB subframes for sending eMBB packets are expected to be relatively long. Further, the outer coding increases redundancy and so reduces the spectral efficiency In view of these issues the inventors have recognized it can be beneficial for a terminal device that has been allocated radio resources for receiving higher layer data from a network infrastructure element to be able to determine when the radio resources it has been allocated are used by the network infrastructure element to transmit different data (e.g. in one example, URLLC data).

Thus, in accordance with certain embodiments of the disclosure, network infrastructure equipment adapts an aspect of its transmissions in association with radio resources allocated for higher layer transmissions to provide an indication of whether any of the radio resources are used for URLLC data. This is to allow an eMBB receiver to auto-detect the occurrence and location of URLLC data within the transmission resources previously allocated for eMBB higher layer data. Thus, when the network infrastructure equipment schedules URLLC data transmissions on resources previously allocated for eMBB user-plane data, the network infrastructure equipment constructs the transmissions in a manner that allows the eMBB receiver to auto-detect the presence of URLLC. There are various ways in which this may be done, as discussed further below.

Figure 6:
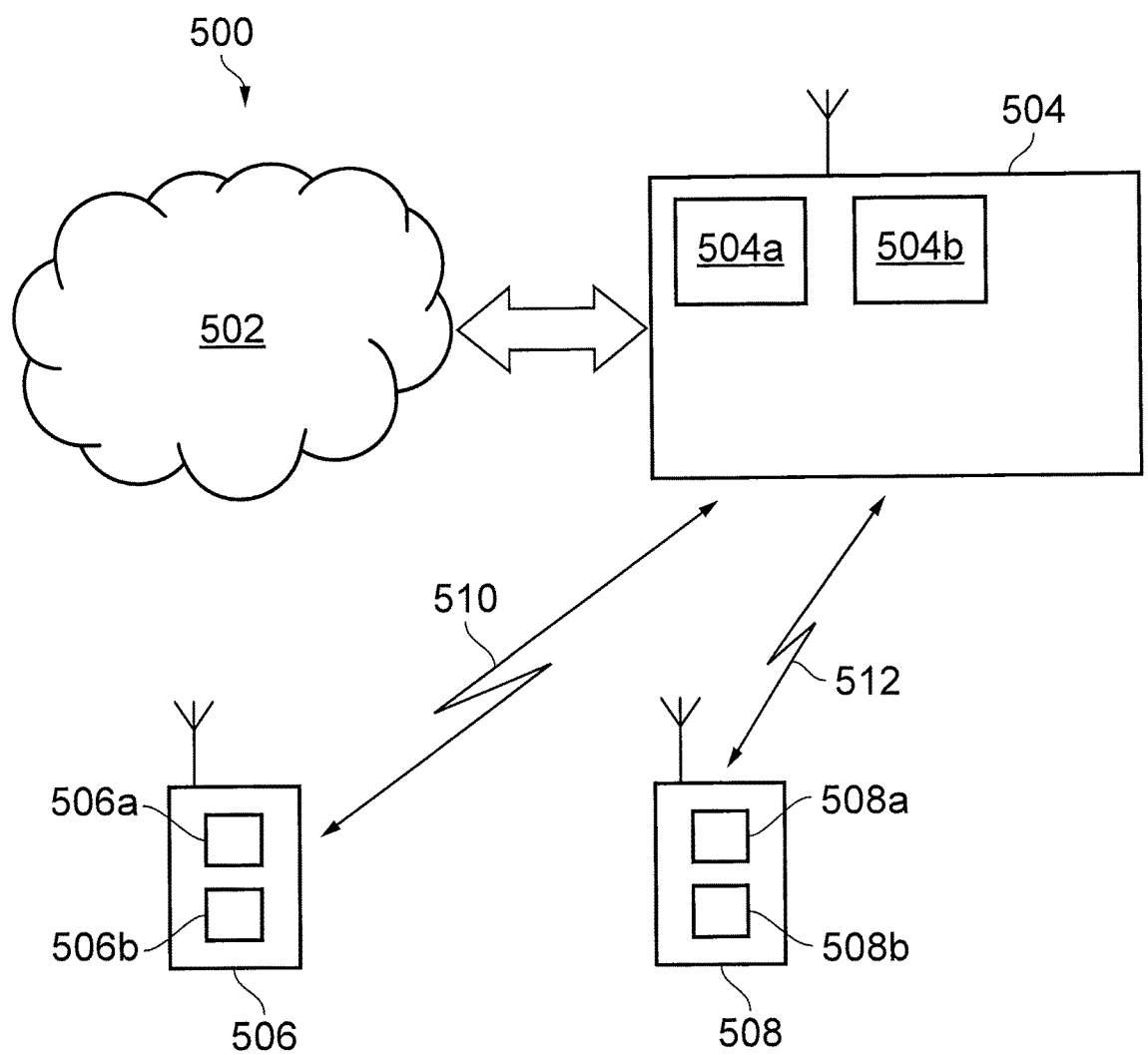
FIG. 6 schematically represents some aspects of a wireless telecommunications system/network configured to operate in accordance with certain embodiments of the present disclosure.

FIG. 6 schematically shows some further details of a telecommunications system 500 according to an embodiment of the present disclosure. For the sake of an example, the telecommunications system 500 here is assumed to be based broadly around an LTE-type architecture that may also support other radio access technologies, either using the same hardware as represented in FIG. 6 with appropriately configured functionality, or separate hardware configured to operate in association with the hardware represented in FIG. 6. However, the specific network architecture in which embodiments of the disclosure may be implemented is not of primary significance to the principles described herein. Many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards and other proposals for operating wireless telecommunications systems.

The telecommunications system 500 comprises a core network part (evolved packet core) 502 coupled to a radio network part. The radio network part comprises a base station (evolved-nodeB) 504 coupled to a plurality of terminal devices. In this example, two terminal devices are shown, namely a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 6 in the interests of simplicity.

As with a conventional mobile radio network, the terminal devices 506, 508 are arranged to communicate data to and from the base station (transceiver station/network infrastructure equipment) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service, EPS, connections with the terminal devices 506, 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 6 may be in accordance with known techniques apart from where modified to provide functionality in accordance with embodiments of the present disclosure as discussed herein.

In this example, it is assumed the first terminal device 506 is an eMBB capable terminal device adapted for receiving eMBB data from the base station over a radio interface based on an eMBB radio frame structure, such as represented in FIG. 3, in accordance with an embodiment of the disclosure. The first terminal device 506 may be referred to herein as an eMBB terminal device for convenience, it being understood that the device may in practice be a generic terminal device, such as a smartphone terminal device, which is running an application that relies on eMBB data. The eMBB terminal device 506 comprises transceiver circuitry 506a (which may also be referred to as a transceiver/transceiver unit) for transmission and reception of wireless signals and processor circuitry 506b (which may also be referred to as a processor/processor unit) configured to control the terminal device 506. The processor circuitry 506b may comprise various sub-units/sub-circuits for providing the desired functionality as explained further herein. These sub-units may be implemented as discrete hardware elements or as appropriately configured functions of the processor circuitry. Thus the processor circuitry 506b may comprise circuitry which is suitably configured/programmed to provide the desired functionality described herein using conventional programming/configuration techniques for equipment in wireless telecommunications systems. The transceiver circuitry 506a and the processor circuitry 506b are schematically shown in FIG. 6 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 506 will in general comprise various other elements associated with its operating functionality, for example a power source, user interface, and so forth, but these are not shown in FIG. 6 in the interests of simplicity.

In this example, it is assumed the second terminal device 508 is a URLLC capable terminal device adapted for receiving URLLC data from the base station over a radio interface based a URLLC radio frame structure, such as represented in FIG. 4, in accordance with an embodiment of the disclosure. The second terminal device 508 may be referred to herein as a URLLC terminal device for convenience, it being understood that the device may in practice be a generic terminal device, such as a smartphone terminal device, which is running an application that relies on URLLC data. However, the URLLC device may in other cases not be a generic smartphone, but may be a device dedicated to an application that uses URLLC data, for example a machine type communications device supporting communication for an autonomous vehicle. It will be appreciated that in principle the first terminal device and the second terminal device may in some situations be the same terminal device which is running both an application relying on the exchange of eMBB data and an application relying on the exchange of URLLC data. As with the eMBB terminal device 506, the URLLC terminal device 508 comprises transceiver circuitry 508a (which may also be referred to as a transceiver/transceiver unit) for transmission and reception of wireless signals and processor circuitry 508b (which may also be referred to as a processor/processor unit) configured to control the terminal device 508. The processor circuitry 508b may comprise various sub-units/sub-circuits for providing desired functionality as explained further herein. These sub-units may be implemented as discrete hardware elements or as appropriately configured functions of the processor circuitry. Thus the processor circuitry 508b may comprise circuitry which is suitably configured/programmed to provide the desired functionality described herein using conventional programming/configuration techniques for equipment in wireless telecommunications systems. The transceiver circuitry 508a and the processor circuitry 508b are schematically shown in FIG. 6 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 508 will in general comprise various other elements associated with its operating functionality, for example a power source, user interface, and so forth, but these are not shown in FIG. 6 in the interests of simplicity.

The base station 504 comprises transceiver circuitry 504a (which may also be referred to as a transceiver/transceiver unit) for transmission and reception of wireless signals and processor circuitry 504b (which may also be referred to as a processor/processor unit) configured to control the base station 504 to operate in accordance with embodiments of the present disclosure as described herein. The processor circuitry 504b may again comprise various sub-units, such as a scheduling unit, for providing functionality in accordance with embodiments of the present disclosure as explained further below. These sub-units may be implemented as discrete hardware elements or as appropriately configured functions of the processor circuitry. Thus, the processor circuitry 504b may comprise circuitry which is suitably configured/programmed to provide the desired functionality described herein using conventional programming/configuration techniques for equipment in wireless telecommunications systems. The transceiver circuitry 504a and the processor circuitry 504b are schematically shown in FIG. 6 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 504 will in general comprise various other elements associated with its operating functionality, such as a scheduler. For example, although not shown in FIG. 6 for simplicity, the processor circuitry 504b may comprise scheduling circuitry, that is to say the processor circuitry 504b may be configured/programmed to provide the scheduling function for the base station.

Thus, the base station 504 is configured to communicate eMBB data with the eMBB terminal device 506 and URLLC data with the URLLC terminal device 508 according to an embodiment of the disclosure over respective communication links 510, 512.

As noted above, the Inventors have recognized in situations where there is a desire for a base station to transmit URLLC data to a URLLC terminal device in time period comprising radio resources that have previously been allocated for the transmission of eMBB higher layer data to an eMBB terminal device, it can be beneficial for the base station to provide to the eMBB terminal device during the eMBB higher layer transmission time period with an indication that some radio resources are affected by the transmission of other data (i.e. in this example URLLC data). This can allow the eMBB terminal device to determine which radio resources it has been allocated to receive eMBB higher layer data are affected by URLLC data transmissions, which can help the terminal device optimise its recovery of the eMBB data. For example, for a recovery scheme based on retransmissions of eMBB data affected by the URLLC data transmissions, the eMBB terminal device is in some examples able to establish which portions of the eMBB data are being retransmitted without the base station needing to provide the terminal device with separate control signalling to indicate this. For a recovery scheme that relies on the eMBB data being transmitted with a degree of redundancy to allow for correct decoding even with some URLLC interference, the decoding process may be optimised if the terminal device is aware of which resources are affected by URLLC transmissions. This is because data received on radio resources affected by URLLC data transmissions can then be ignored by the eMBB terminal device rather than included as what is in effect noise in the eMBB higher layer data decoding process. More generally, it will be appreciated the specific recovery mechanism that is adopted in a given implementation is not significant to the principles described herein for allowing the terminal device to detect which radio resources it has been allocated to receive higher layer data are affected by the transmission of other data.

Various approaches for providing an indication of radio resources affected by URLLC (or other) data are discussed in more details below.

In accordance with some approaches the eMBB higher layer data for a terminal device may be divided into a plurality of higher layer data blocks with error detection coding applied to individual higher layer data blocks before transmission to the terminal device, whereby detection of an error by the terminal device during decoding in respect of one or more of the higher layer data blocks provides the terminal device with the indication of the subset of allocated radio resources used for the transmission of URLLC data.

Figure 7:
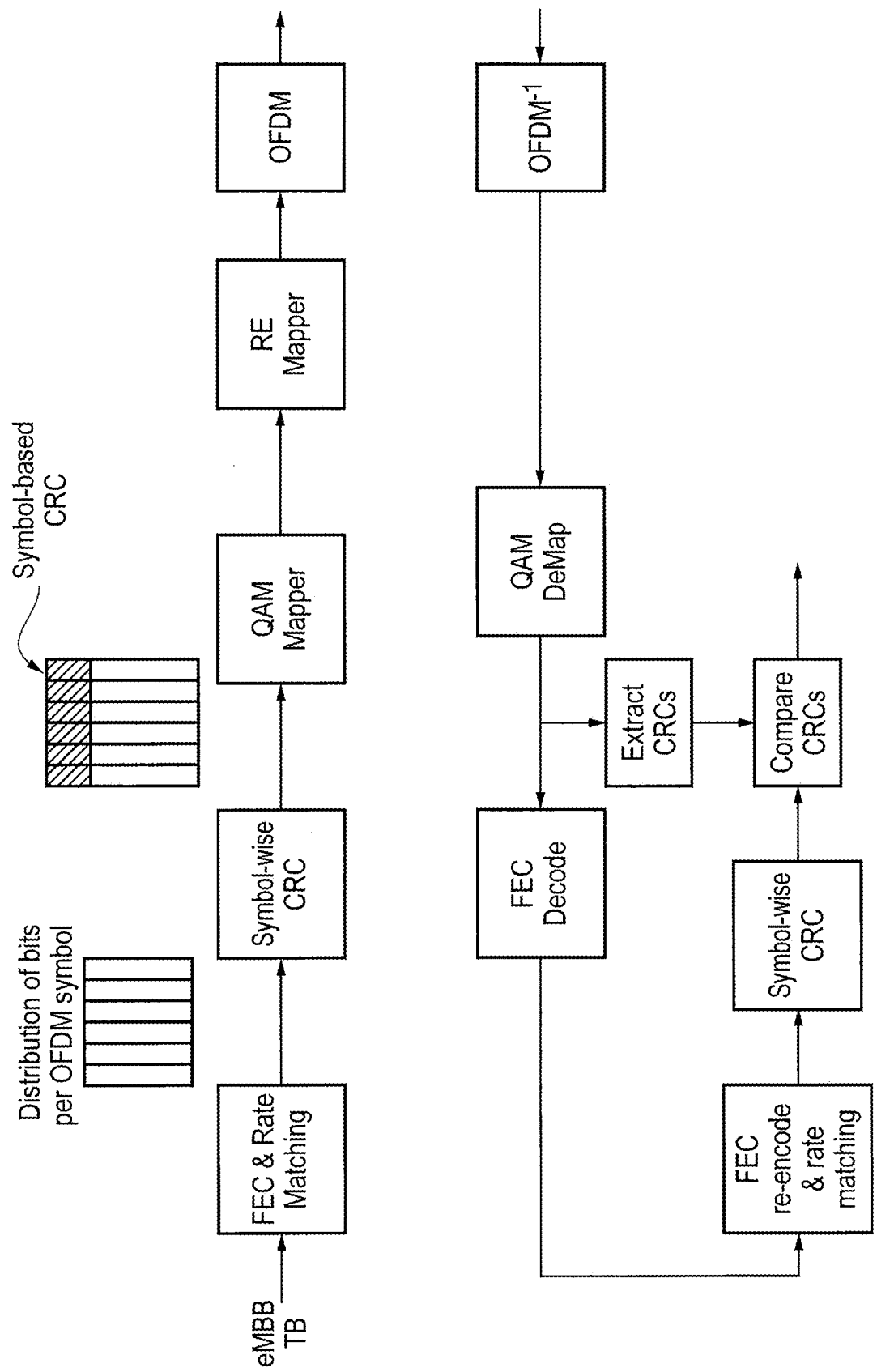
FIG. 7 schematically represents a coding process and a decoding process in accordance with certain embodiments of the disclosure.

Thus, in one example, the eMBB higher layer data may be transmitted using OFDM and the transport processing for eMBB higher layer data may limit the number of higher layer data bits to be mapped to each OFDM symbol so as to leave space for cyclic redundancy check bits for each symbol calculated for the higher layer data bits for the symbol. At the eMBB receiver (e.g. the eMBB terminal device 506 in FIG. 6), each of these CRCs are checked after decoding the eMBB transport block and a pattern of failure of the CRCs taken to indicate the footprint of URLLC transmission that affected the eMBB higher layer data transmissions. For a recovery mechanism based on retransmission, the terminal device may be configured to assume subsequent retransmissions of OFDM symbols are retransmissions of the OFDM symbols for which the CRC failed. The transmitting entity (e.g. the base station 504 in FIG. 6 or other network infrastructure equipment according to the implementation at hand) may be configured to retransmit the eMBB data associated with the URLLC affected symbols in the same order as they were initially allocated for transmission (or other predetermined order), to allow the terminal device to determine where the retransmitted symbols fit into the initial eMBB data transmission. An example transmitter and receiver chain for this approach is schematically represented in FIG. 7.

Thus, in the transmitter (network infrastructure equipment) chain (upper part of FIG. 7) an eMBB transport block (TB) for transmission is received in an "FEC & Rate Matching" element and rate matched taking into account the number, B, of bits of CRC that are to be added per OFDM symbol. After FEC, the eMBB higher layer data code word is partitioned into groups (sub-blocks) with each group destined for transmission on a single OFDM symbol. To each group is then appended a CRC of B bits calculated from the bits of the group (in a "Symbol-wise CRC" element). In some examples, B=8, but in other cases different values may be used. After the bits of each group are modulated using the designated QAM constellation (in a "QAM Mapper" element), they are mapped to the designated REs (in a "RE Mapper" element) of the symbol prior to OFDM (in an "OFDM" element of the processing chain). On the receiver (terminal device) chain (lower part of FIG. 7), after channel equalisation (in an "OFDM-1" element), the QAM symbols are de-mapped (in a "QAM DeMap" element). From the log-likelihood ratios (LLRs) pertaining to each OFDM symbol, a hard decision is taken for the bits corresponding to the symbol-wise CRC (in an "Extract CRC" element). Then after FEC decoding of the payload (in an "FEC Decode" element"), the decoded TB is re-encoded and re-partitioned (in a "FEC re-encode and rate matching" element) into groups (sub-blocks) in a similar way to the partitioning at the transmitter in the "FEC and Rate Matching" element in the transmitter chain. CRCs of B bits are calculated from the bits of the group (in a "Symbol-wise CRC" element) in a similar way to the CRC determination at the transmitter in the "Symbol-wise CRC" element in the transmitter chain. The resulting CRC bits from the "Symbol-wise CRC" element in the receiver chain and the CRC bits extracted in the "Extract CRC" element" are then compared (in a "Compare CRCs" element in the receiver chain processing). For OFDM symbols where there is not a match (i.e. a failure of decoding for the bits carried in the corresponding OFDM symbol), the terminal device may be configured to conclude this is an indication the radio resources used for conveying the relevant OFDM symbol(s) have been used for transmitting other data (e.g. URLLC) in addition to (or instead of depending on the application at hand) the eMBB higher layer data previously scheduled for transmission on those radio resources.

Although the example discussed above is based on a CRC process for error detection coding, it will be appreciated the same principles can be applied using other error detection coding techniques applied to sub-blocks of a transport block of eMBB higher layer data, for example using error detection coding processes based on parity check techniques.

In accordance with some other approaches the network infrastructure equipment may be configured to transmit a predefined signature sequence in association with the transmission of URLLC data which the terminal device can detect to provide the terminal device with the indication that at least some radio resources previously allocated for transmitting higher layer data (e.g. eMBB data) to the terminal device are used for the transmission of other data (e.g. URLLC) data.

For example, in one application the URLLC data transmission may be made with a URLLC radio frame structure comprising a URLLC control channel and a URLLC data channel (for example as schematically shown in FIG. 4) which is multiplexed into a higher layer data transmission period (data channel period) of an eMBB radio frame structure (for example as schematically shown in FIG. 5).

In one example a predefined signature sequence (i.e. a sequence predefined for the purpose of indicating transmission of other data on pre-allocated radio resources) may be included in the URLLC control channel region. A terminal device detecting this signature sequence on radio resources in a particular time and frequency range during a transmission time period for eMBB higher layer data may take this to provide an indication radio resources in this frequency range (or other derivable frequency range) are, for a predefined period of time after detection of the signature sequence (e.g. a period of time associated with the duration of a URLLC subframe), used for transmitting URLLC data. In cases where the URLLC data may extend over a variable duration (e.g. for a variable URLLC subframe length or multiple URLLC subframes), there may be a predefined association between different ones of a plurality of predefined signature sequences and different durations of URLLC transmission. Thus the network infrastructure equipment can select a predefined signature sequence to use from among the plurality of predefined signature sequences to provide an indication of the amount of radio resources (e.g. in terms of a duration in time following the transmission of the predefined sequence) as well as the start time for transmissions of URLLC data in the eMBB user data transmission period.

In another example, a predefined signature QAM symbol sequence for indicating transmission of data other than what has previously been indicated to a terminal device as being allocated to particular radio resources may be inserted into an eMBB user-plane transmission period just prior to the start of a transmission of URLLC data. As above, the URLLC data transmissions may be configured to extend for a predefined duration after detection of the predefined signature sequence, which may depend on which of a plurality of predefined signature sequences has been transmitted by the base station. However, in other cases, the completion of the URLLC data transmission during the eMBB user data transmission time period may be indicated by the transmission of another predefined signature sequence just after the end of the URLLC transmission. In this regard the predefined signature sequence transmitted before the URLLC data transmission to indicate the start of URLLC data transmission may be considered to correspond to the transmission of what may be conveniently referred to as an escape word, and a predefined signature sequence transmitted after the URLLC data transmission to indicate the end of URLLC data transmission may be considered to correspond to the transmission of what may be conveniently referred to as a return word. The eMBB receiver may thus determine radio resources between the detection of the escape word and the detection of the return word are used for transmitting URLLC data and, for example, should be ignored/excluded when seeking to decode the eMBB data received during the eMBB higher layer data transmission time period. An example of this approach is schematically shown in FIG. 8.

In the example represented in FIG. 8 it can be seen the terminal device is configured to assume all radio resources between the escape word and the return word are affected by the transmission of URLLC data. However, as can also be seen in FIG. 8, in this implementation the URLLC data is transmitted over a narrower frequency band than the eMBB higher layer data. Thus, in some implementations the transmission of the escape word may also be associated with an indication of the extent in frequency of the URLLC transmissions so that radio resources outside the frequency on which the URLLC transmissions are made may be used for conveying eMBB higher layer data in the normal way. The extent in frequency of the URLLC data transmissions may be predefined, for example by standard or prior signalling exchange, or may be indicated by the position and/or extent of the escape word in frequency space, for example in accordance with a predefined mapping.

In accordance with certain embodiments of the disclosure, the receiver may detect the escape word (and the return word where used) using a matched filter or sliding correlator. In implementations of this approach, a terminal device receiving the URLLC data may treat the URLLC initiation sequence (escape word) as a URLLC slot synchronization signal or a URLLC reference signal to facilitate decoding of the URLLC transmission.

The escape and return words could be any sequence of QAM symbols having appropriate autocorrelation properties. FIG. 9 schematically represents a processing chain for generating QAM symbols representing escape/return words in a transmitter (network infrastructure equipment) and FIG. 10 schematically represents a processing chain for detecting the presence of the QAM symbols representing escape/return words in a receiver (terminal device) in accordance with some example implementations.

The occasions on which return and escape words are to be generated (which will depend on the scheduling of URLLC data, which may be performed in accordance with generally conventional scheduling techniques) may be referred to herein as events. Different events may be associated with different event codes (code inputs), for example as schematically indicated in FIG. 11.

In one example implementation the escape and return words (event words) are taken to be made up of 32 QPSK symbols. The input sequences for the event words are in this example valid code words of a Reed-Muller (32) code which codes the particular event code such as schematically shown in the table represented in FIG. 11. The RM(32) code may for example be the same as specified in Release 8 of the 3GPP standard.

Thus, as can be seen in FIG. 9, at the transmitter, a copy of the 32 bit RM(32) codeword is cyclically delayed by 2 bits. The cyclically delayed sequence is then XOR-ed with a code generated from a 32 bit Walsh-Hadamard (WH) sequence. The output of the Walsh-Hadamard mixer is treated as the lsb input to the QPSK constellation mapper (and so determines the Q-component) while the equivalent bit from the RM(32) code word is treated as the msb (and so determines the I-component). Each tuple is then modulated using QPSK to generate 32 quadrature symbols which are mapped to the resource elements (radio resources) just before the start of the URLLC (in the case of an escape word) or to the 32 resource elements just after the end of the URLLC transmission (in the case of a return word).

As can be seen in FIG. 10, at the receiver, any resource elements/radio resources postulated to carry elements of a given event word are treated as if they were QPSK modulated. The I-component is cyclically shifted by 2 and then combined with the Q-component. This combined sequence is then input into a filter matched to the bipolar form of the relevant WH sequence. A significant peak at the output of the matched filter indicates the presence of the event word while the position of the peak indicates with respect to the eMBB resource element counter the start or end of URLLC as the case may be.

For authentication of the particular escape or return word, the relevant QPSK symbols can be demodulated, for example using the decoding chain schematically illustrated in FIG. 12 and the RM(32) code decoded to confirm whether it matches one of the code inputs associated with the escape/return signature words.

As will be noted from FIG. 11, in this example four different events are proposed. Namely an escape event and a return event, as discussed above, but also additional escape and return events associated with eMBB HARQ procedures. In some implementations, different signature sequences may be used to indicate escape and return depending on whether the event occurs in a first transmission of eMBB data or a retransmission of eMBB data. This can be helpful in case an aspect of the eMBB data happens to be similar to a predefined escape word such that a terminal device receiving eMBB data may erroneously interpret this aspect of the eMBB data as an escape word, which can be expected to increase the chance of a failed reception of the eMBB data, thereby triggering a HARQ retransmission. By associating a different sequence with the escape word in a retransmission, the terminal device will be looking for this different signature sequence, thereby reducing the chance of repeatedly erroneously detecting an escape event because an aspect of the eMBB data is similar to an escape code sequence.

In some example implementations, the choice of WH sequence used in the processing represented in FIGS. 9 and 10 may also depend on which of the four events of Table 1 are being signalled. This can also help ensure that for retransmissions, the escape or return word detector at the receiver would be looking for a different word than it does for a first ("normal") transmission. Some example WH codes that may be used in different implementations are represented in the table of FIG. 13.

In some example implementations the indication that certain radio resources/OFDM symbols are being used for conveying URLLC data may be provided by the network infrastructure equipment superposing a predefined random sequence on the resource elements of the radio resources carrying the URLLC data. The terminal device can be configured to detect this predefined random sequence, thereby receiving an indication that the corresponding radio resources which were previously allocated for transmitting higher layer data (e.g. eMBB data) for the terminal device are being used by the network infrastructure equipment for the transmission of other data (e.g. URLLC) data. The predefined random sequence may be detected by the terminal device receiving the eMBB data using a matched filter or a sliding correlator, for example, to detect the use of radio resources for transmitting URLLC data. The predefined random sequence can be either static and fixed for all URLLC transmissions or may be semi-statically configurable, for example by the network infrastructure equipment, and signalled in a downlink control channel to the eMBB receiver.

As is common in wireless telecommunications systems, the network infrastructure equipment may transmit demodulation reference symbols (DM-RS) during the higher layer transmission period for the eMBB data to allow the eMBB terminal device to estimate channel conditions for the allocated radio resources. In accordance with some approaches of the present disclosure, the network infrastructure equipment may be configured to provide the eMBB terminal device with an indication that certain radio resources which the terminal device has been allocated for receiving eMBB data are being used for transmitting URLLC data by modifying the transmission of reference symbols provided for estimating channel conditions for the radio resources carrying URLLC data.

In some examples the network infrastructure equipment may modify the transmission of reference symbols for estimating channel conditions for radio resources used for transmitting URLLC data by using different reference symbol sequences than would be used if the radio resources were not used for transmitting URLLC data.

For example, the network infrastructure may be configured to use a first DM-RS for eMBB data and a second, different, DM-RS for URLLC data. Thus the network infrastructure equipment may modify the transmission of reference symbols associated with radio resources carrying URLLC data by changing from the DM-RS defined for eMBB data to the different DM-RS defined for URLLC. An eMBB seeking to determine channel conditions for the allocated reference symbols used for URLLC data transmissions would not receive the expected DM-RS, and so its channel estimation function would determine there is a rapidly changing, or otherwise unstable, channel during the portion of the transmission afflicted by URLLC data transmission, and the terminal device may be configured to conclude from this the relevant radio resources have been used for transmitting URLLC data.

In some examples the network infrastructure equipment may modify the transmission of reference symbols for estimating channel conditions for radio resources used for transmitting URLLC data by not transmitting any reference symbols in association with these radio resources (i.e. the eMBB DM-RS for radio resources carrying URLLC data may in effect be zeroed). In this case, the channel estimation function for the eMBB terminal device would measure a zero channel, but a power measurement on other signals would indicate the presence of transmissions on the relevant radio resources (i.e. the URLLC data transmission). This disparity between the energy determined by channel estimation and the energy determined on other radio resource elements can be taken by the terminal device to indicate the eMBB data it had been allocated to receive on those radio resources has been corrupted/affected by URLLC data transmissions.

In some examples the network infrastructure equipment may modify the transmission of reference symbols for estimating channel conditions for radio resources used for transmitting URLLC data by inverting the reference symbols transmitted in association with these radio resources. In this case, the channel estimation function for the eMBB terminal device would detect an inversion of the channel for these radio resources, and this can be taken by the terminal device to indicate the transmission of URLLC data on these radio resources.

In some examples the network infrastructure equipment may modify the transmission of reference symbols by transmitting reference symbols on different radio resources than would be used if the subset of allocated radio resources used for transmitting other data were not used for transmitting other data. For example, the network infrastructure equipment may be configured to use a different pattern of resource elements for conveying eMBB DM-RS than for URLLC DM-RS. This may in particular arise, for example, when the eMBB data and URLLC data are transmitted using different OFDM subcarrier spacings. The DM-RS pattern for URLLC may be configurable and signaled to the eMBB receiver in its downlink control channel. The eMBB receiver can thus carry out a sliding window correlation for the URLLC DM-RS pattern to detect the onset of URLLC transmissions on radio resources that have previously been allocated for transmitting user-plane data to the terminal device.

In accordance with some other approaches the eMBB higher layer data may be transmitted as a plurality of symbols, and one or more data bits in one or more symbols may be used to provide a URLLC indicator channel. Data bits corresponding to the URLLC indicator channel may be set to a predetermined value (as flag) to provide the terminal device with an indication the radio resources used for the symbol are used for transmitting URLLC data.

That is to say, the transmitter (network infrastructure equipment) may designate some subcarriers in each OFDM symbol for use to indicate whether the said OFDM symbol contains URLLC data. The designated subcarriers together carry a URLLC mini-slot channel indicator (UMIC). When URLLC is scheduled for transmission on the particular symbol, the UMIC is set to indicate this, and the eMBB is either punctured, superposed or rate matched. At the receiver (terminal device) the UMIC designated subcarriers in each OFDM symbol may be decoded to indicate the presence or not of URLLC data. One potential drawback for this approach is the combined resources used for the UMIC on all OFDM symbols in the eMBB sub-frame may be considered to unduly deplete the available radio resource pool for eMBB data, and so reduce spectral efficiency, even in sub-frames in which there are no URLLC data transmissions. If this is considered a concern for a given implementation, the URLLC data can be constrained to be scheduled within designated mini-slots each comprised of a configurable number of OFDM symbols. In these circumstances, each frame can be considered to comprise a predefined number of mini-slots that may be used for URLLC data transmissions and which begin and end at predefined OFDM symbols. The UMIC subcarriers may then be provided/designated only for a limited number of the OFDM symbols in each mini-slot, e.g. only in the first OFDM symbol of each mini-slot. Thus if a mini-slot is comprised of N symbols, the amount of resources designated for transmission of the UMIC in a sub-frame will be reduced by a factor N when compared to the case of providing for UMIC in every OFDM symbol. To help ensure reliable reception of the UMIC, it may be transmitted using a robust modulation scheme such as BPSK. The UMIC may also be coded using a simple short code, such as the (7,4) Hamming code. The resulting 4-bit UMIC word could either be a fixed word for indicating the presence or not of URLLC data—e.g. '0101' for no URLLC data and '1010' for URLLC data in the OFDM symbol or mini-slot. Alternative it could also indicate where the URLLC occurs within the symbol or mini-slot.

Thus with this approach, the UMIC indicates whether any part of a mini-slot is affected by URLLC data transmissions. An eMBB terminal device may then consider any mini-slot that is indicated by the UMIC as being an invalid mini-slot and act appropriately (e.g. puncture those mini-slots).

To help reliably identify all the radio resources affected by URLLC in cases where the corresponding indication provided by the network infrastructure equipment might not be reliably detected (or might not be transmitted) on all radio resources used for transmitting URLLC data, in accordance with some embodiments the radio resources that may be used for transmitting URLLC data are restricted to a limited set of predetermined sizes and/or locations within the array of available radio resources in the eMBB subframe (i.e. within a predefined raster). Thus if a terminal device detects an indication of a URLLC data transmission on radio resources within one of the predefined sets of radio resources, the terminal device may conclude the URLLC data transmission should be assumed to have occurred over all the radio resources comprising the relevant predefined set. An example of this is schematically shown in the radio resource grid of FIG. 14. Here it is assumed URLLC data are constrained to predefined groups of resources which are regularly arranged in an array of blocks with a duration in time corresponding to one URLLC mini slot (i.e. what may be considered a URLLC radio subframe duration) and spanning eight physical resource blocks in frequency (other implementations may use other numbers of resource blocks, for example 4, or 16, or another number). In this example it is assumed the terminal device receives an indication of URLLC transmissions being made in the irregular region labelled as the "area measured to be afflicted by URLLC". From this the terminal device can conclude the area (potentially) affected by URLLC should be taken to correspond to the two blocks identified by the heavy outline and labelled "area determines to be afflicted by URLLC". Accordingly, even with an imperfect process for detection of which radio resources are used for transmitting URLLC data, the terminal device is more likely to be able to establish the full extent of the radio resources used for transmitting URLLC data.

Thus, various approaches have been described for providing a terminal device with an indication of when radio resources that have been allocated to the terminal device for receiving higher layer data are used for transmitting other data in the wireless telecommunication system. As noted above, this can help the terminal device more efficiently recover from the issues raised by the URLLC the data interference.

Significantly, the terminal device is thus able to determine which radio resources it has been allocated to receive higher layer data from the network infrastructure equipment may have been affected by the transmission of other data, without needing to receive any control signalling from the network infrastructure equipment after the end of the higher layer data transmission time period to indicate which radio resources were affected by URLLC data transmissions. This approach therefore also helps avoid the need for additional control signalling after the completion of the transmission of the higher layer data as well as allowing the terminal device to take recovery action more quickly. As already noted, the specific recovery action to take will depend on the recovery mechanism in place, and this is not significant to the principles described herein.

However, one particular aspect of a recovery mechanism that may benefit from approaches in accordance with embodiments of the invention is in relation to the transmission of acknowledgment signalling by the terminal device in respect of the reception of the eMBB data. In particular, because the terminal device can automatically determine which radio resources are affected by URLLC data transmissions, it can be configured to ignore these radio resources when deciding whether to send an indication of successful receipt (ACK) or unsuccessful receipt (NACK) for the eMBB data transmitted on radio resources not affected by the URLLC data.

Figure 15:
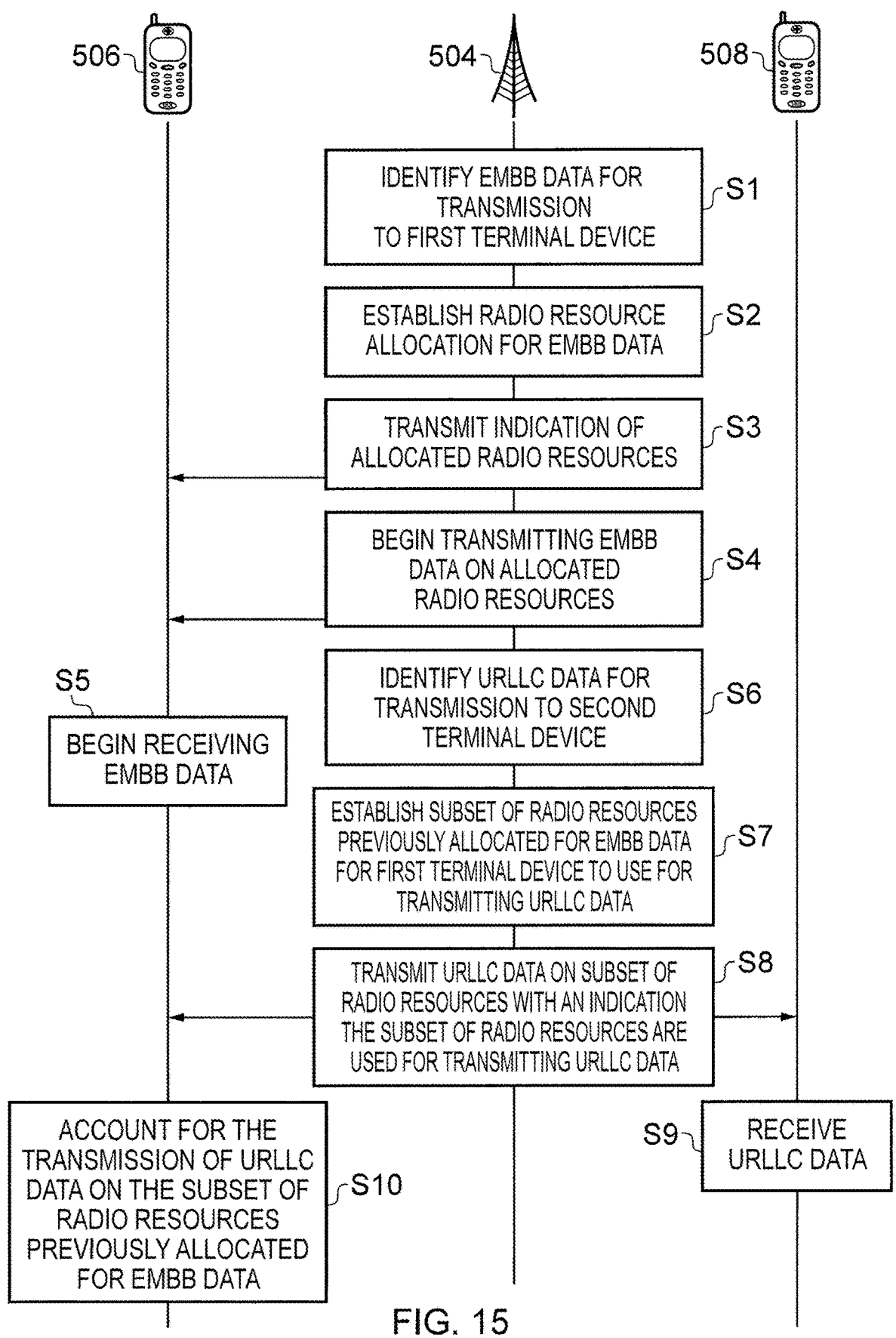
FIG. 15 is a ladder diagram representing some aspects of operation in a wireless telecommunications system in accordance with certain embodiments of the present disclosure.

FIG. 15 is a ladder diagram schematically representing signalling message exchange between the base station 504, the first (eMBB) terminal device 506 and the second (URLLC) terminal device 508 represented in FIG. 6 in accordance with certain embodiments of the disclosure. As for elsewhere, aspects of the processing which can be invented in accordance with commission techniques are not described in detail.

In step S1 the base station determines, using its controller circuitry, that it has eMBB data to transmit to the first terminal device. The content and reason for transmitting this data is not significant.

In step S2 the base station establishes, using its controller circuitry, an allocation of radio resources for transmitting the eMBB data to the first terminal device. This may be performed having regard to conventional scheduling techniques.

In step S3 the base station transmits, using its transceiver circuitry, an indication of the allocated radio resources to the first terminal device. This may be performed having regard to conventional techniques for conveying allocation signalling in wireless communications systems.

In step S4 the base station begins transmitting, using its transceiver circuitry, the eMBB data on the allocated radio resources.

In step S5 the terminal device begins receiving, using its transceiver circuitry, the eMBB data.

In step S6, while the eMBB data is being transmitted to the first terminal device, the base station determines, using its controller circuitry, that it has URLLC data to transmit to the second terminal device. The content and reason for needing to transmit this data is not significant.

In step S7, the base station establishes, using its controller circuitry, a subset of the remaining radio resources allocated for transmitting the eMBB data to the first terminal device to use for transmitting the URLLC data to the second terminal device.

In step S8, the base station transmits, using its transceiver circuitry, the URLLC data on the subset of the remaining radio resources identified in step S7 along with an indication the subset of radio resources are used for transmitting URLLC data. This transmission is received by both the first and second terminal devices, using their respective transceiver circuitry, as indicated in FIG. 15. The indication that the subset of radio resources are used for transmitting URLLC data may be provided in accordance with any of the technique discussed above.

In step S9, the second terminal device receives, using its transceiver circuitry, the URLLC data.

In step s10, the first terminal device, using its controller circuitry, accounts for the transmission of the URLLC data on the radio resources indicated in step S8. As discussed above, the particular manner in which the first terminal device takes account of this information will depend on the particular recovery mechanism being used, and is not significant to the principles underlying the method is disclosed herein.

It may be noted various example approaches discussed herein rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling.

Thus there has been described a method of operating a wireless telecommunications system for communicating user plane data (an example of higher layer data) from network infrastructure comprising establishing an allocation of radio resources for the network infrastructure equipment to use for transmitting user plane data to the terminal device during a user plane data transmission period; transmitting an indication of the allocated radio resources to the terminal device; beginning transmission of the user plane data to the terminal device at the beginning of the user plane data transmission period; and subsequently identifying during the user plane data transmission period whether any of the allocated radio resources which have not yet been used are needed by the network infrastructure equipment for transmitting other data in the wireless telecommunications system, and if so, establishing a subset of the allocated radio resources for the network infrastructure equipment to use for transmitting other data and transmitting other data using the subset of the allocated radio resources; and wherein the method further comprises the network infrastructure equipment conveying to the terminal device during the user plane data transmission period an indication, for example an indication at the physical layer, of which of the allocated radio resources are used for the transmission of other data.

It will be appreciated that while the above-described examples have focused on a downlink implementation, the principles may also be used in respect of uplink communications. I.e. in respect of communications between a transmitting entity (which in the examples above is network infrastructure equipment, but which in other examples could be a terminal device) and a receiving entity (which in the examples above is a terminal device, but which in other examples could be network infrastructure equipment.

By way of an example of an uplink implementation a single terminal device may support both eMBB and URLLC services. In one application there may be eMMB a robot surgery system that operates both eMBB and URLLC. A patient is in a room with a robot and a nurse. The surgeon is a long way away with the controller of the robot (joystick etc). There is a video uplink of what the surgeon is doing, so the surgeon can communicate with the nurse (e.g. give a spoken instruction to move a bandage). This traffic goes over eMBB. The robot control commands, however, go over URLLC (since they are very time critical). The eNB can allocate eMBB to the UE and the if the UE has URLLC data, it may overwrite its eMBB transmission with the URLLC data. The receiving entity for the data, for example network infrastructure equipment, then needs to determine which of the data that it received (in the uplink) was eMBB and which was URLLC and this may be done in accordance with the principles described above.

In our example, a new radio access technology may support grant-free uplink transmissions from terminal devices. In this case, the receiver entity does not know when the terminal device is going to transmit. The network infrastructure equipment can allocate a first terminal device to transmit eMBB data in the uplink (e.g. uploading a video stream). The second terminal device may be running a URLLC service and need to transmit uplink data quickly and so use the resource that happens to be also used by the first-terminal device transmitting eMBB data with an indication it is transmitting URLLC data in accordance with the principles described above.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

Respective features of the present disclosure are defined by the following numbered paragraphs:

1. A method of operating a transmitter entity in a wireless telecommunications system for communicating higher layer data to a receiver entity, wherein the method comprises: establishing an allocation of radio resources for the transmitter entity to use for transmitting higher layer data to the receiver entity during a higher layer data transmission period; transmitting an indication of the allocated radio resources to the receiver entity; beginning transmission of the higher layer data to the receiver entity at the beginning of the higher layer data transmission period using the allocated radio resources; and identifying during the higher layer data transmission period whether any of the allocated radio resources which have not yet been used are needed by the transmitter entity for transmitting other data in the wireless telecommunications system, and if so, establishing a subset of the allocated radio resources for the transmitter entity to use for transmitting the other data and transmitting the other data using the subset of the allocated radio resources; wherein the method further comprises the transmitter entity conveying to the receiver entity during the higher layer data transmission period an indication of the subset of allocated radio resources used for the transmission of other data.

Paragraph 2. The method of paragraph 1, wherein the method further comprises dividing the higher layer data into a plurality of higher layer data code blocks and applying error detection coding to individual higher layer data code blocks before transmission to the receiver entity, whereby detection of an error by the receiver entity during decoding in respect of one or more of the higher layer data code blocks provides the receiver entity with the indication of the subset of allocated radio resources used for the transmission of other data.

Paragraph 3. The method of paragraph 2, wherein the error detection coding is based on a cyclic redundancy check process and/or wherein the error detection coding is based on a parity check process.

Paragraph 4. The method of any of paragraphs 1 to 3, further comprising transmitting a predefined signature sequence in association with the transmission of other data to provide the receiver entity with the indication of the subset of allocated radio resources used for the transmission of other data.

Paragraph 5. The method of paragraph 4, wherein the predefined signature sequence is transmitted prior to the transmission of the other data to indicate the start of the transmission of the other data on the subset of allocated radio resources.

Paragraph 6. The method of paragraph 4 or 5, further comprising transmitting a predefined signature sequence after the transmission of the other data to indicate the end of the transmission of the other data on the subset of allocated radio resources.

Paragraph 7. The method of paragraph 4, wherein the predefined signature sequence is superposed on the other data for transmission using the subset of allocated radio resources.

Paragraph 8. The method of any of paragraphs 4 to 7, wherein the predefined signature sequence is selected from among a plurality of predefined signature sequences.

Paragraph 9. The method of paragraph 8, wherein respective ones of the plurality of predefined signature sequences are associated with different amounts of radio resource, and the predefined signature sequence is selected by the transmitter entity from among the plurality of predefined signature sequences according to the amount of radio resources used for transmission of other data.

Paragraph 10. The method of paragraph 8 or 9, wherein the predefined signature sequence is selected by the transmitter entity from among the plurality of predefined signature sequences according to whether the transmission of the higher layer data to the receiver entity is a first transmission of the higher layer data to the receiver entity or a retransmission of the higher layer data to the receiver entity.

Paragraph 11. The method of any of paragraphs 1 to 10, further comprising the transmitter entity transmitting reference symbols during the higher layer transmission period to allow the receiver entity to estimate channel conditions for the allocated radio resources, and wherein the method comprises modifying the transmission of reference symbols provided for estimating channel conditions for the subset of allocated radio resources used for transmitting other data to provide the receiver entity with the indication of the subset of allocated radio resources used for the transmission of other data.

Paragraph 12. The method of paragraph 11, wherein modifying the transmission of reference symbols for estimating channel conditions for the subset of allocated radio resources used for transmitting other data comprises using different reference symbols than would be used if the subset of allocated radio resources used for transmitting other data were not used for transmitting other data.

Paragraph 13. The method of any of paragraph 11, wherein modifying the transmission of reference symbols for estimating channel conditions for the subset of allocated radio resources used for transmitting other data comprises not transmitting reference symbols for the receiver entity to use for estimating channel conditions for the subset of allocated radio resources used for transmitting other data.

Paragraph 14. The method of paragraph 11, wherein modifying the transmission of reference symbols for estimating channel conditions for the subset of allocated radio resources used for transmitting other data comprises inverting the reference symbols that would be used if the subset of allocated radio resources used for transmitting other data were not used for transmitting other data.

Paragraph 15. The method of paragraph 11, wherein modifying the transmission of reference symbols for estimating channel conditions for the subset of allocated radio resources used for transmitting other data comprises transmitting reference symbols on different radio resources than would be used if the subset of allocated radio resources used for transmitting other data were not used for transmitting other data.

Paragraph 16. The method of any of paragraphs 1 to 15, wherein higher layer data is transmitted as a plurality of symbols, and wherein one or more data bits in one or more symbols carried on the subset of allocated radio resources used for transmitting other data are set to a predetermined value to provide the receiver entity with the indication of the subset of allocated radio resources used for the transmission of other data.

Paragraph 17. The method of any of paragraphs 1 to 16, wherein the subset of allocated radio resources used for transmitting other data is restricted to a limited set of predetermined sizes and/or locations within the array of available radio resources within the higher layer transmission time period.

Paragraph 18. The method of any of paragraphs 1 to 17, wherein the transmitter entity does not send any further indication of the subset of allocated radio resources used for the transmission of other data after the end of the higher layer data transmission window.

Paragraph 19. The method of any of paragraphs 1 to 18, wherein acknowledgement signalling received by the transmitter entity from the receiver entity in respect of the higher layer data transmitted to the receiver entity in the higher layer transmission time period is treated as applying only in respect of transmissions made on allocated radio resources that are not in the subset of radio resources used by the transmitter entity for transmitting other data.

Paragraph 20. The method of any of paragraphs 1 to 19, wherein the other data comprise other higher layer data transmitted in another higher layer data transmission period that is smaller than and within the higher layer data transmission period for transmitting the higher layer transmissions to the receiver entity.

Paragraph 21. The method of any of paragraphs 1 to 20, wherein the other data comprises data classed as data that should be transmitted by the transmitter entity with lower latency than the higher layer data for the receiver entity.

Paragraph 22. The method of any of paragraphs 1 to 21, wherein the other data is transmitted in addition to the higher layer data for the receiver entity on the subset of allocated radio resources used for transmitting the other data.

Paragraph 23. A transmitter entity for use in a wireless telecommunications system for communicating higher layer data to a receiver entity, wherein the transmitter entity comprises controller circuitry and transceiver circuitry configured to operate together such that the transmitter entity is operable to: establish an allocation of radio resources for the transmitter entity to use for transmitting higher layer data to the receiver entity during a higher layer data transmission period; transmit an indication of the allocated radio resources to the receiver entity; begin transmission of the higher layer data to the receiver entity at the beginning of the higher layer data transmission period using the allocated radio resources; identify during the higher layer data transmission period whether any of the allocated radio resources which have not yet been used are needed by the transmitter entity for transmitting other data in the wireless telecommunications system, and if so, establish a subset of the allocated radio resources for the transmitter entity to use for transmitting the other data and transmit the other data using the subset of the allocated radio resources; and convey to the receiver entity during the higher layer data transmission period an indication of the subset of allocated radio resources used for the transmission of other data.

Paragraph 24. Circuitry for a transmitter entity for use in a wireless telecommunications system for communicating higher layer data to a receiver entity, wherein the circuitry comprises controller circuitry and transceiver circuitry configured to operate together such that the circuitry is operable to: establish an allocation of radio resources for the transmitter entity to use for transmitting higher layer data to the receiver entity during a higher layer data transmission period; transmit an indication of the allocated radio resources to the receiver entity; begin transmission of the higher layer data to the receiver entity at the beginning of the higher layer data transmission period using the allocated radio resources; identify during the higher layer data transmission period whether any of the allocated radio resources which have not yet been used are needed by the transmitter entity for transmitting other data in the wireless telecommunications system, and if so, establish a subset of the allocated radio resources for the transmitter entity to use for transmitting the other data and transmit the other data using the subset of the allocated radio resources; and convey to the receiver entity during the higher layer data transmission period an indication of the subset of allocated radio resources used for the transmission of other data.

Paragraph 25. A method of operating a receiver entity in a wireless telecommunications system for receiving higher layer data from a transmitter entity, wherein the method comprises: receiving from the transmitter entity an indication of an allocation of radio resources for the receiver entity to use for receiving higher layer data from the transmitter entity during a higher layer data transmission period; receiving transmissions from the transmitter entity on the allocated radio resources; and identifying whether any of the allocated radio resources in the higher layer transmission time period for the receiver entity are used by the transmitter entity for transmitting other data than the higher layer data for the receiver entity based on whether the transmitter entity conveys to the receiver entity during the higher layer data transmission period an indication of a subset of allocated radio resources used by the network infrastructure for the transmission of other data.

Paragraph 26. A receiver entity for use in a wireless telecommunications system for receiving higher layer data from a transmitter entity, wherein the receiver entity comprises controller circuitry and transceiver circuitry configured to operate together such that the receiver entity is operable to: receive from the transmitter entity an indication of an allocation of radio resources for the receiver entity to use for receiving higher layer data from the transmitter entity during a higher layer data transmission period; receive transmissions from the transmitter entity on the allocated radio resources; and identify whether any of the allocated radio resources in the higher layer transmission time period for the receiver entity are used by the transmitter entity for transmitting other data than the higher layer data for the receiver entity based on whether the transmitter entity conveys to the receiver entity during the higher layer data transmission period an indication of a subset of allocated radio resources used by the network infrastructure for the transmission of other data.

Paragraph 27. Circuitry for a receiver entity for use in a wireless telecommunications system for receiving higher layer data from a transmitter entity, wherein the circuitry comprises controller circuitry and transceiver circuitry configured to operate together such that the circuitry is operable to: receive from the transmitter entity an indication of an allocation of radio resources for the receiver entity to use for receiving higher layer data from the transmitter entity during a higher layer data transmission period; receive transmissions from the transmitter entity on the allocated radio resources; and identify whether any of the allocated radio resources in the higher layer transmission time period for the receiver entity are used by the transmitter entity for transmitting other data than the higher layer data for the receiver entity based on whether the transmitter entity conveys to the receiver entity during the higher layer data transmission period an indication of a subset of allocated radio resources used by the network infrastructure for the transmission of other data.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP document RP-160671, "New SID Proposal: Study on New Radio Access Technology," NTT DOCOMO, RAN #71, Gothenburg, Sweden, 7 to 10. March, 2016

[2] Holma H. and Toskala A, "LTE for UMTS OFDMA and SC-FDMA based radio access", John Wiley and Sons, 2009

[3] 3GPP document TR36.859: Technical Specification Group Radio Access Network; "Study on Downlink Multiuser Superposition Transmission (MUST) for LTE"; (Release 13), November 2015

What is claimed is:

1. A method of operating a transmitter entity in a wireless telecommunications system for communicating higher layer data to a receiver entity, wherein the method comprises:
    establishing an allocation of radio resources for the transmitter entity to use for transmitting higher layer data to the receiver entity during a higher layer data transmission period;
    transmitting an indication of the allocated radio resources to the receiver entity, wherein the indication includes a predefined signature sequence;
    beginning transmission of the higher layer data to the receiver entity at the beginning of the higher layer data transmission period using the allocated radio resources; and
    identifying during the higher layer data transmission period whether any of the allocated radio resources which have not yet been used are needed by the transmitter entity for transmitting other data in the wireless telecommunications system, and if so, establishing a subset of the allocated radio resources for the transmitter entity to use for transmitting the other data and transmitting the other data using the subset of the allocated radio resources;
    wherein the method further comprises the transmitter entity conveying to the receiver entity during the higher layer data transmission period an indication of the subset of allocated radio resources used for the transmission of other data; and
    wherein the predefined signature sequence is selected by the transmitter entity from among a plurality of predefined signature sequences according to whether the transmission of the higher layer data to the receiver entity is a first transmission of the higher layer data to the receiver entity or a retransmission of the higher layer data to the receiver entity.

2. The method of claim 1, wherein the predefined signature sequence is in a control channel region for the other data that is multiplexed along with a data channel for the other data into a data channel period of the allocation of radio resources in the higher layer data transmission period.

3. The method of claim 1, wherein the method further comprises dividing the higher layer data into a plurality of higher layer data code blocks and applying error detection coding to individual higher layer data code blocks before transmission to the receiver entity, whereby detection of an error by the receiver entity during decoding in respect of one or more of the higher layer data code blocks provides the receiver entity with the indication of the subset of allocated radio resources used for the transmission of other data.

4. The method of claim 3, wherein the error detection coding is based on a cyclic redundancy check process and/or wherein the error detection coding is based on a parity check process.

5. The method of claim 1, wherein respective ones of the plurality of predefined signature sequences are associated with different amounts of radio resource, and the predefined signature sequence is selected by the transmitter entity from among the plurality of predefined signature sequences according to the amount of radio resources used for transmission of other data.

6. The method of claim 1, further comprising transmitting reference symbols during the higher layer transmission period to allow the receiver entity to estimate channel conditions for the allocated radio resources, and modifying the transmission of reference symbols provided for estimating channel conditions for the subset of allocated radio resources used for transmitting other data to provide the receiver entity with the indication of the subset of allocated radio resources used for the transmission of other data.

7. The method of claim 1, further comprising transmitting higher layer data as a plurality of symbols, and set one or more data bits in one or more symbols carried on the subset of allocated radio resources used for transmitting other data to a predetermined value to provide the receiver entity with the indication of the subset of allocated radio resources used for the transmission of other data.

8. A transmitter entity for use in a wireless telecommunications system for communicating higher layer data to a receiver entity, wherein the transmitter entity comprises controller circuitry and transceiver circuitry configured to operate together such that the transmitter entity is operable to:
establish an allocation of radio resources for the transmitter entity to use for transmitting higher layer data to the receiver entity during a higher layer data transmission period;
transmit an indication of the allocated radio resources to the receiver entity, wherein the indication includes a predefined signature sequence;
begin transmission of the higher layer data to the receiver entity at the beginning of the higher layer data transmission period using the allocated radio resources;
identify during the higher layer data transmission period whether any of the allocated radio resources which have not yet been used are needed by the transmitter entity for transmitting other data in the wireless telecommunications system, and if so, establish a subset of the allocated radio resources for the transmitter entity to use for transmitting the other data and transmit the other data using the subset of the allocated radio resources; and
convey to the receiver entity during the higher layer data transmission period an indication of the subset of allocated radio resources used for the transmission of other data,
wherein the predefined signature sequence is selected by the transmitter entity from among a plurality of predefined signature sequences according to whether the transmission of the higher layer data to the receiver entity is a first transmission of the higher layer data to the receiver entity or a retransmission of the higher layer data to the receiver entity.

9. The transmitter entity of claim 8, wherein the predefined signature sequence in a control channel region for the other data that is multiplexed along with a data channel for the other data into a data channel period of the allocation of radio resources in the higher layer data transmission period.

10. The transmitter entity of claim 8, wherein the transmitter entity is further operable to:
divide the higher layer data into a plurality of higher layer data code blocks and apply error detection coding to individual higher layer data code blocks before transmission to the receiver entity, whereby detection of an error by the receiver entity during decoding in respect of one or more of the higher layer data code blocks provides the receiver entity with the indication of the subset of allocated radio resources used for the transmission of other data.

11. The transmitter entity of claim 10, wherein the error detection coding is based on a cyclic redundancy check process and/or wherein the error detection coding is based on a parity check process.

12. The transmitter entity of claim 8, wherein respective ones of the plurality of predefined signature sequences are associated with different amounts of radio resource, and the transmitter entity is further operable to select the predefined signature sequence from among the plurality of predefined signature sequences according to the amount of radio resources used for transmission of other data.

13. The transmitter entity of claim 8, wherein the transmitter entity is further operable to transmit reference symbols during the higher layer transmission period to allow the receiver entity to estimate channel conditions for the allocated radio resources, and modify the transmission of reference symbols provided for estimating channel conditions for the subset of allocated radio resources used for transmitting other data to provide the receiver entity with the indication of the subset of allocated radio resources used for the transmission of other data.

14. A receiver entity for use in a wireless telecommunications system for receiving higher layer data from a transmitter entity, wherein the receiver entity comprises controller circuitry and transceiver circuitry configured to operate together such that the receiver entity is operable to:
receive from the transmitter entity an indication of an allocation of radio resources for the receiver entity to use for receiving higher layer data from the transmitter entity during a higher layer data transmission period, wherein the indication includes a predefined signature sequence;
receive transmissions from the transmitter entity on the allocated radio resources; and
identify whether any of the allocated radio resources in the higher layer transmission period for the receiver entity are used by the transmitter entity for transmitting other data than the higher layer data for the receiver entity based on whether the transmitter entity conveys to the receiver entity during the higher layer data transmission period an indication of a subset of allocated radio resources used by the transmitter entity for the transmission of other data, wherein the predefined signature sequence is selected by the transmitter entity from among a plurality of predefined signature sequences according to whether the transmission of the higher layer data to the receiver entity is a first transmission of the higher layer data to the receiver entity or a retransmission of the higher layer data to the receiver entity.

15. The receiver entity of claim 14, wherein the predefined signature sequence is in a control channel region for the other data that is multiplexed along with a data channel for the other data into a data channel period of the allocation of radio resources in the higher layer data transmission period.

16. The receiver entity of claim 14, wherein the receiver entity is further operable to:

receive reference symbols during the higher layer transmission period;

estimate channel conditions for the allocated radio resources; and receive modified reference symbols provided for estimating channel conditions for the subset of allocated radio resources used for transmitting other data to indicate the subset of allocated radio resources used for the transmission of other data.

17. The receiver entity of claim 14, wherein the receiver entity is further operable to:

receive the higher layer data into a plurality of higher layer data code blocks and applying error detection coding to individual higher layer data code blocks and an indication of the subset of allocated radio resources used for the transmission of other data; and detect an error during decoding in respect of one or more of the higher layer data code blocks.

18. The receiver entity of claim 17, wherein the error detection coding is based on a cyclic redundancy check process and/or wherein the error detection coding is based on a parity check process.

19. The receiver entity of claim 14, wherein respective ones of the plurality of predefined signature sequences are associated with different amounts of radio resource, and the predefined signature sequence is selected by the transmitter entity from among the plurality of predefined signature sequences according to the amount of radio resources used for transmission of other data.

20. The receiver entity of claim 14, wherein the receiver entity is further operable to:

receive higher layer data as a plurality of symbols and one or more data bits in one or more symbols carried on the subset of allocated radio resources set to a predetermined value.

* * * * *